Patented Jan. 1, 1935

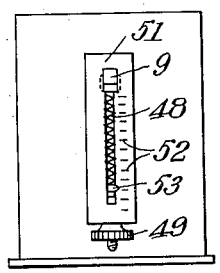
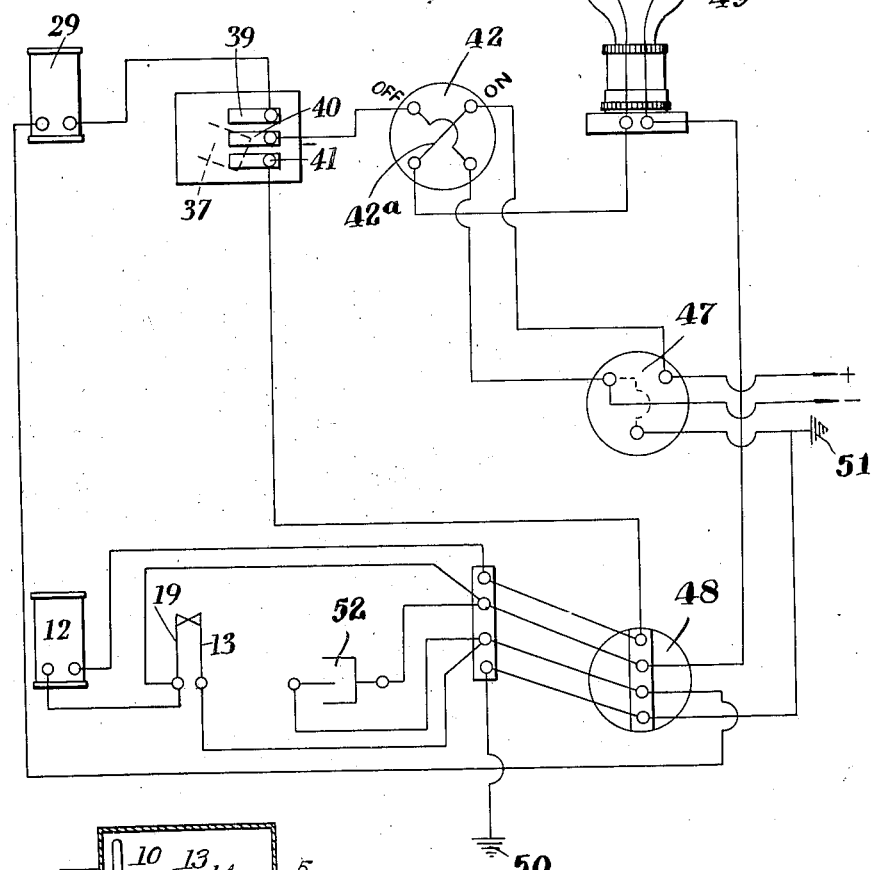
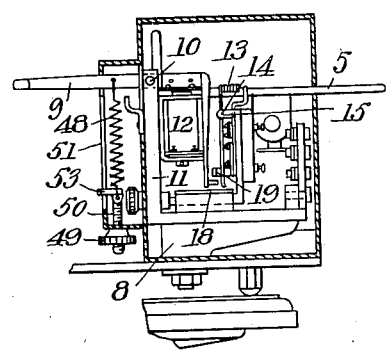

1,986,268

UNITED STATES PATENT OFFICE 1,986,268

APPARATUS FOR AUTOMATICALLY DELIVERING AND WEIGHING PREDETERMINED QUANTITIES OF MATERIAL

John Hughes, Liverpool, and Thomas Ottiwell Ward, Roby, England

Application June 12, 1930, Serial No. 460,754
In Great Britain June 13, 1929

10 Claims. (Cl. 249—15)

The present invention relates to apparatus for automatically delivering and weighing predetermined quantities of material such as granular material like tea, sugar or cereals contained in a hopper or container and has for its chief object to improve such apparatus with a view to reducing or minimizing the chances of obtaining an erroneous weighing.

More especially the present invention relates to apparatus in which the material is delivered from a supply hopper through a slotted delivery spout and is allowed to fall into one pan of an ordinary weighing scale the descent of which pan due to the material supplied thereto acts to cut off the flow of material into the pan.

In such apparatus there is always some material in flight between the hopper and the scale pan after the supply has been cut off which ultimately reaches the scale pan and means are provided for compensating for this material so that just the correct weight of material is delivered to the scales. One form of compensating means employed has consisted of a rod—along which a weight may be moved and set in any position according to the nature of the material being weighed and the distance through which it has to fall—pivotally mounted at one end on the base of the scales and adapted to rest at its other or free end on a pin projecting laterally from the scale pan the free end of the rod being connected by a cord with the cut-off device associated with hopper in such a manner that the rod is lifted clear of the pin when the supply of material from the hopper to the scale pan is interrupted thus giving free movement to the scales and enabling the weighing to be checked in the usual manner.

Now it is found that when it is desired to deal with relatively large volumes of material inaccuracies are likely to arise in the weighing unless the various parts of the apparatus and in particular the compensating means are frequently overhauled or adjusted and it is a more particular object of the present invention to provide an improved apparatus in which the various parts thereof and especially the compensating mechanism are more positive and reliable in their action.

With the above objects in view and such others as will hereinafter appear or are incidental thereto the present invention in its broadest aspect consists in apparatus for automatically delivering and weighing material in which predetermined quantities of material are adapted to be delivered from a hopper to a scale or like weighing apparatus and in which the material in flight between the hopper and the scale pan after cut-off of the supply to the scale pan is compensated for by means adapted to be operated electrically to permit free weighing movement of the scale and enable the weight of the material supplied to the scale pan to be readily checked.

More narrowly regarded the present invention consists in apparatus for automatically delivering and weighing material comprising in combination a supply hopper adapted to contain in bulk material to be weighed, a scale or other weighing apparatus, and compensating means including a member adapted to follow the movement of the scale pan during a weighing operation and electrical means brought into operation by said member after it has followed the movement of said scale pan for a predetermined interval or distance for cutting off the discharge of material from said hopper and ensuring free weighing movement of the scale for the purpose of enabling the weight of material supplied to the scale pan to be checked.

Preferably the compensating mechanism is not attached to the scale itself in any way nor does it require any modification in existing forms of scale and consequently any suitable known form of scale may be used.

In one form of compensating means contemplated under the present invention a lever adapted to rest at what may be termed its free end on one scale pan is pivotally mounted upon a support and is adapted to cooperate at its other end with electrical mechanism preferably including a solenoid or electromagnet in such wise that when the free end of the lever has followed the downward movement of the scale pan due to the material supplied thereto for a certain interval or distance an electric circuit is completed or interrupted thereby causing the discharge of material from the hopper to the scale pan to be interrupted or cut off (by a suitable valve) at such time that the weight of material supplied to the scale pan before cut off plus the weight of material in flight between the hopper and the scale pan at the instant of cut off is exactly that required to balance the weight applied to the other scale pan. Closure of said valve completes another electrical circuit which energizes a solenoid or electromagnet which acts on the lever to lift the free end thereof from the scale pan to permit the weight to be checked from the scales in the usual manner.

In order that the present invention may be more clearly understood and readily carried into effect reference may now be had to the accompanying drawings illustrating by way of example one form of apparatus constructed according to the present invention.

In the accompanying drawings:—

Figure 4 is a wiring diagram of the electrical circuit of the apparatus.

Figure 1:
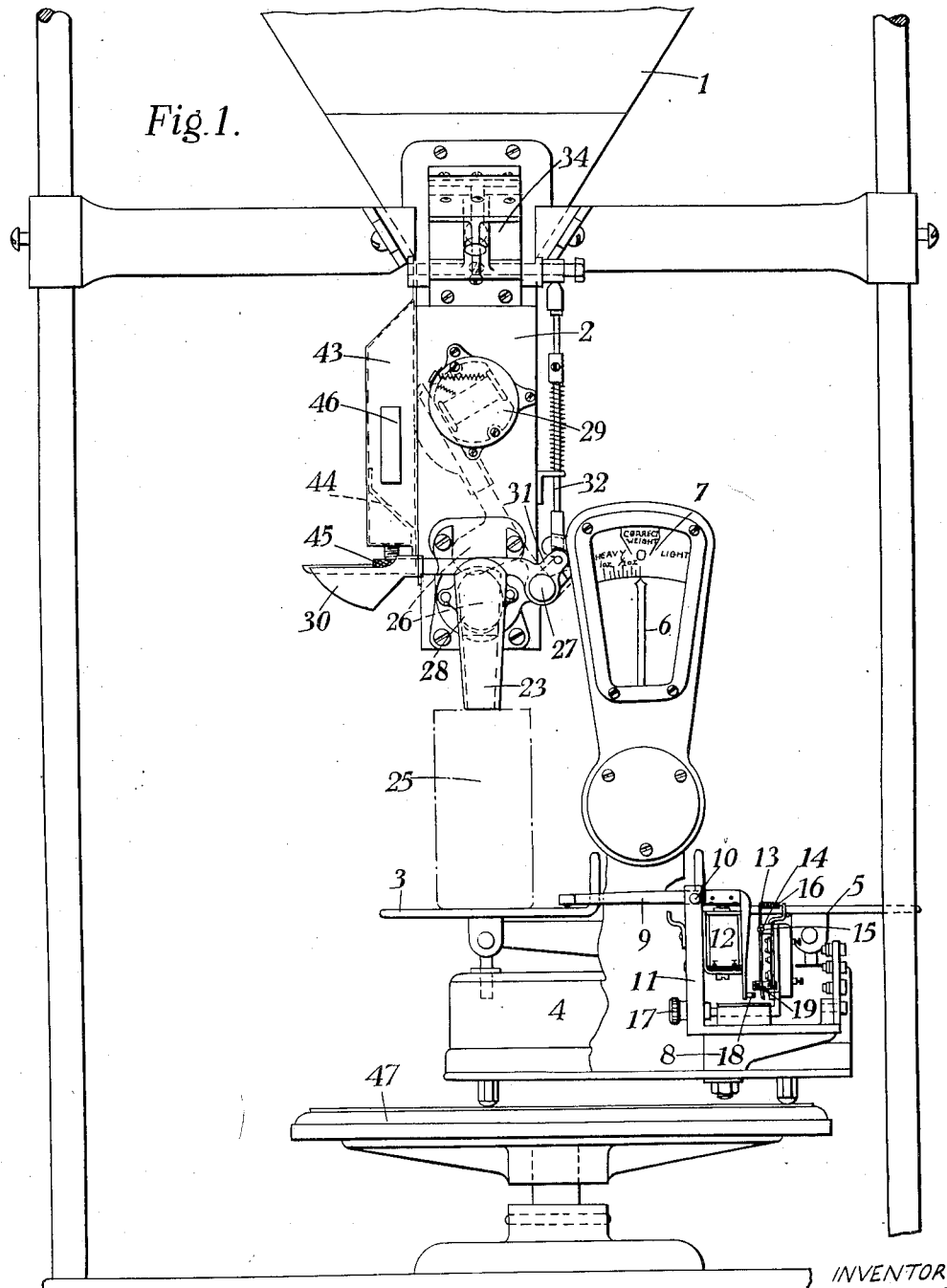
Figure 1 is a front elevational view of the principal parts of one constructional form of apparatus according to this invention, the major portion of the supply hopper being omitted.

In the apparatus shown in the drawings the reference numeral 1 indicates the supply hopper proper which is adapted to contain in bulk the material—such as tea, sugar or like granular material—to be weighed out into small quantities of equal and accurate weight. The hopper 1 is adapted to communicate at intervals with a measuring chamber 2 from which the material is adapted to be discharged on to the goods pan 3 of a weighing scale 4 of any suitable known form. In the drawings the scale 4 is shown as an ordinary equi-armed scale having goods and weight pans 3 and 5 respectively and a pointer 6 moving over a chart 7 having a central zero position. When therefore exact balance is had the pointer 6 points to zero on the scale and the supply of too much or too little material to the scale pan 3 is indicated by the pointer coming to rest to the left or to the right of the zero position.

Attached to the scale 4 is the compensating mechanism designated generally by the reference numeral 8 in Figure 1. This mechanism comprises an arm 9 pivoted at 10 on a standard 11 and adapted to bear lightly at one end on the scale pan 3. The opposite end of the arm 9 is fashioned at right angles as shown and cooperates with electrical mechanism which will be hereinafter described. It may here be stated that the arm 9 is accurately mounted upon its pivot 10 in such wise that when the arm 9 is free the end thereof bearing on the scale pan 3 will just follow the movements of the scale pan but will not exert any appreciable pressure on the scale pan 3.

An electromagnet or solenoid 12 is mounted for cooperation with the end of the arm 9 remote from that bearing on the scale pan 3 so that when energized the solenoid or electromagnet will rock the arm 9 about its pivot 10 and lift the free end thereof off the scale pan 3.

Also mounted for cooperation with the arm 9 is a resilient element or member 13 pivotally or rockably mounted at 14 on a member 15 and biased at one end by a spring 16 so that its other end is forced into engagement with a stop or contact 19 also mounted on the member 15. The member 15 is adjustable relatively to the arm 9 by means of a hand screw 17 so as to permit alteration of the point at which the projection 18 of the arm 9 will contact with the member 15 and break the contact between it and a stop or contact 19 due to downward movement of the end of the arm 9 resting on the scale pan 3.

As previously mentioned the hopper 1 communicates with a measuring chamber 2 the capacity of which is preferably adjustable to suit different materials or requirements. This adjustment may be obtained by means of a partition 20 mounted to pivot or hinge about a point 21 within the chamber and the position of which is adjustable from without by means of an adjusting screw 22 which is preferably provided with a scale (not shown) calibrated in such a manner that the capacity of the chamber 2 for different positions of adjustment of the partition 20 may be read off readily.

The material is adapted to flow by gravity from the chamber 2 through delivery spout 23 having an inclined portion 24 into a bag or other receptacle 25 resting on the scale pan 3.

The discharge of material from the measuring chamber 2 is adapted to be cut off or stopped by a valve 26—having a portion of disc or like form—pivotally mounted at 27 and adapted for cooperation with a slot 28 in the delivery spout 23. The valve 26 is adapted to be held in the open position by a solenoid or electromagnet 29 located in suitable position on one wall of the measuring chamber 2 and may be moved to the open position manually by engagement of its extension 30.

The valve 26 is operatively connected by means of suitable linkage 31, 32 and 33 with another valve 34 adapted to control the supply of material from the hopper 1 to the measuring chamber 2 and the operation of the valves 26 and 34 is such that when the former valve is open the latter is closed and vice versa. If desired baffle plates 34a may be provided in the lower part of the hopper 1 or the hopper casing itself may be suitably shaped for regulating and controlling the flow of material from the hopper 1 past the valve 34 and into the chamber 2.

Secured to the link 32 between the valves 26 and 34 is an element 35 adapted to cooperate with the forked end 36 of a contact device 37 pivotally mounted at 38 so that depending upon the position of the valve 26 and 34 the device 37 is adapted to bridge either the contacts 39 and 40 or 40 and 41. The contacts 39, 40 and 41 and also the electromagnet 29 are connected in an electrical circuit to be hereinafter described and a switch 42 having a rotatable contact arm 42a may be provided for controlling operation of apparatus as a whole.

For the purpose of contributing to an accurate weighing of material the measuring chamber may be so constructed that while the major portion of the material to be weighed is adapted to be fed rapidly therefrom on to the pan 3 of the scale when the valve is open some material is adapted to be fed to the pan 3 in the form of a continuous dribble. For this purpose an additional container—such as 43—may be provided either within the chamber 2 or mounted exteriorly thereof as shown in the drawings but adapted to feed a relatively small quantity of material in the form of a continuous dribble through the delivery spout 23, the material being fed from the container 43 through an aperture 43a in the wall of the chamber 2 into that chamber and from thence out through the delivery spout 23. For controlling the quantity of material supplied from the container 43 any convenient control means may be provided. In the apparatus shown in the drawings such means take the form of an inclined plate 44 the position of which is adjustable up and down by means of a screw or the like 45 to regulate the opening of the aperture 43a. A window 46 of any suitable transparent material may be provided in the container 43 to enable the operator to watch the flow of material. In the apparatus shown the container 43 is filled with material by the operator through its open top as and when required.

Figure 4 shows the manner in which the various electrical elements may be connected in circuit and preferably the component parts of the electrical equipment are so designed that the necessary electrical energy may be obtained by simply connecting the apparatus—as by the usual plug 47—to the ordinary domestic lighting or power mains. As shown in Figure 4 the apparatus is designed for connection to a direct current supply circuit by means of the plug 47 and a further plug point 48 is employed for convenience of assembly. 49 indicates a lamp which acts as a resistance in the circuit but where an alternating current supply is employed a low voltage rectifier and transformer may be used in place of the lamp 49. The apparatus is connected to earth at suitable points, such as 50 and 51 for protective purposes as will be well understood and 52 indicates a condenser for the purpose of absorbing the surges of current which take place when the circuit is made and broken. Neither the condenser nor earthing means is essential to the invention. The other parts of the apparatus are indicated in Fig. 4 by the same reference numerals as are used in the other figures.

Figure 2:
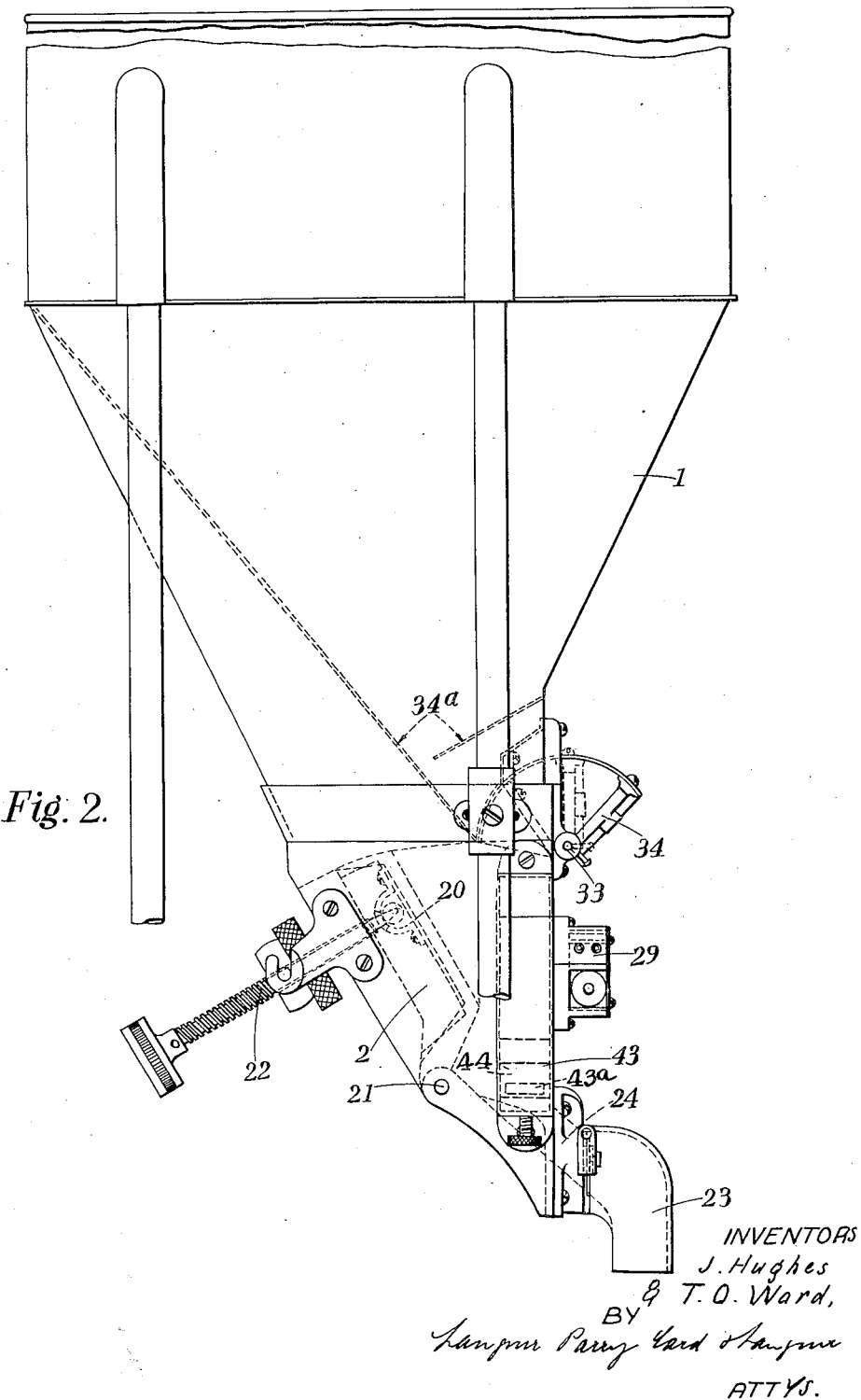
Figure 2 is a view of the supply hopper looking from the left hand side of Figure 1.
Figure 3:
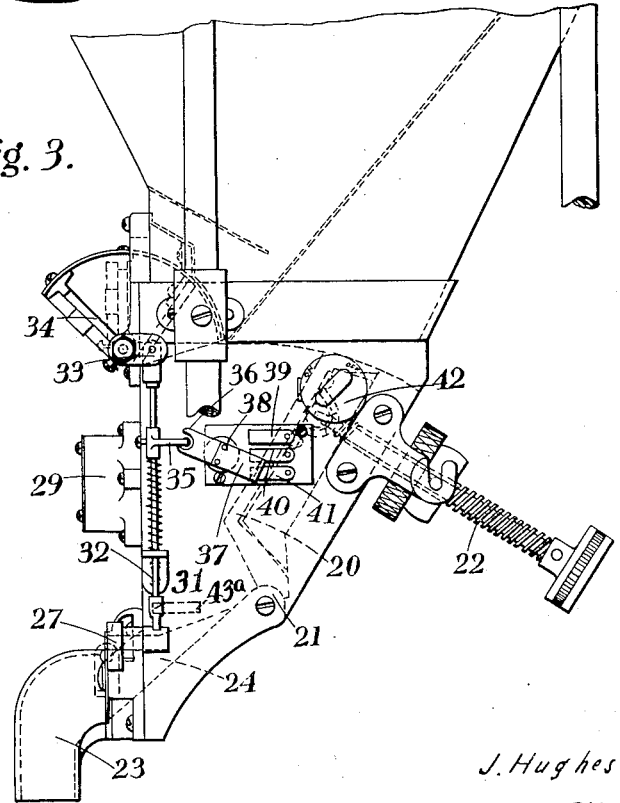
Figure 3 is a view of the supply hopper looking from the right hand side of Figure 1.

Assuming the various parts of the apparatus to be in the positions shown in Figures 1, 2 and 3 of the drawings to effect a weighing operation the attendant after connecting the apparatus to the electric supply mains by means of the plug 47, turns the switch 42 to the "on" position. He then takes hold of the extension 30 of the valve 26 and raises it into the dotted line position shown in Figure 1. The effect of this is to cause the link 32 between the valves to move downwardly and thereby to swing the contact device 37 about its pivot 38 to bridge the contacts 39, 40. Current therefore flows through the electromagnet 29 which operates to hold the valve 26 in the dotted line position shown in Figure 1.

Movement of the valve 26 to the position shown in dotted lines in Figure 1 also operates to close the valve 34 and thereby to cut off communication between the hopper 1 and chamber 2, and at the same time to permit material to flow from the chamber 2—which has been previously filled from the hopper 1—into the receptacle 25 provided for its reception below the discharge orifice 23 and on the scale pan 3, a suitabile weight having been provided on the weight pan 5 of the scale 4.

Material continues to be fed to the receptacle 25 until the weight on the scale pan 3 approaches in value the weight applied to weight pan 5 when the scale pan 3 commences to move downwardly. The end of the arm 9 of the compensating mechanism 8 resting on the scale pan 3 follows the downward movement of the scale pan 3 for a certain interval or distance found by previous experiment to be suitable at the end of which interval or distance it has moved sufficiently far to permit of the projection 18 at the other end of the arm 9 to make contact with the member 13 and to break its contact with the contact 19. The effect of this is to break the circuit through the electromagnet 29 with the result that the valve 26 rotates about its pivot under the action of gravity and cuts off the supply of material from the chamber 2 to the receptacle 25 on the scale pan 3. This movement of the valve 26 operates to open the valve 34 between the hopper 1 and chamber 2 through the linkage described with the result that the chamber 2 immediately commences to be refilled; it also operates to move the device 37 to bridge the contacts 40, 41, and the effect of this is to energize the electromagnet 12 which thereon rocks the arm 9 about its pivot 10 and raises the end thereof in contact with the scale pan 3 free of the scale pan so that the scale 4 is free of all outside influence. The weight of material supplied to the scale pan 3 should under these conditions exactly balance the weight applied to the weight pan 5 and whether this is so or not may be checked by observation of pointer 6 moving over the chart 7. If the weight is not exactly correct a slight adjustment of the apparatus—such as by turning the screw 17 to reduce the distance between stop 18 and member 13 and thus make the cut off of the supply of material from the chamber 2 a little earlier or a little later—may be made.

It will be understood that before commencing a series of weighings the machine is adjusted by experiment and that after this initial adjustment a series of weighings may be rapidly made merely by the operator opening the valve 26, the weights obtained being of course checked after each operation by observation of the position of the pointer 6 on the chart 7.

As shown in Figure 1 the scale 4 may be mounted upon a table or platform 47 the height of which is adjustable or variable in any convenient manner.

It will be appreciated that although in the foregoing description one particular form of apparatus has been described many modifications may be made therein without departing from the spirit and scope of the invention, for example instead of the valve 26 being opened by hand, means may be provided for automatically accomplishing this. Again instead of the compensating mechanism being adapted to operate on a time or distance basis as described the arm 9 may be adapted actually to exert a force on the scale pan 3 and for this purpose between the pivot for the lever and the end thereof which is adapted to bear on the scale pan there may be fastened one end of a spring—for example a helical spring—the tension of which is adjustable so that any desired additional weight equivalent to the weight of the material in flight between the hopper and scale pan after cut-off may be caused to act on the scale pan a suitably graduated chart being provided to enable the added weight to be adjusted conveniently. As the foregoing modifications will be readily apparent to those skilled in the art after an understanding of the invention no further illustration thereof is deemed necessary.

What we claim is:—

1. Apparatus for automatically delivering and weighing material comprising in combination a hopper adapted to contain material to be weighed in bulk, a scale, a valve for controlling the supply of material from said hopper to said scale, means including a member adapted to follow the movements of the scale for controlling said valve so that the amount of material in flight between the hopper and scale pan at the instant of cut off is just sufficient to give the correct weight of material and electrical means for withdrawing said member from said scale to permit free weighing movement of the scale and enable the weight of material supplied thereto to be checked readily.

2. Apparatus for automatically delivering and weighing material comprising in combination a supply hopper adapted to contain in bulk material to be weighed, a scale, and compensating means including a member adapted to follow the movement of a scale pan during a weighing operation and electrical means brought into operation by said member after it has followed the scale pan for a predetermined interval or distance for stopping the discharge of material from said hopper and withdrawing said member from the scale pan thereby ensuring free weighing movement of the scale for the purpose of enabling the weight of material supplied thereto to be readily checked.

3. Apparatus for automatically delivering and weighing material comprising in combination a hopper adapted to contain material to be weighed in bulk, a scale, a valve for controlling the supply of material from said hopper to said scale, means for following the movements of said scale during a weighing operation, electrical means operated by said second mentioned means for closing said valve and other electrical means for withdrawing said second mentioned means from said scale and enabling the weight of material supplied to said scale pan to be readily checked.

4. Apparatus for automatically delivering and weighing material comprising in combination a hopper adapted to contain in bulk material to be weighed, a scale, a valve for controlling the supply of material from said hopper to the goods pan of said scale, a member responsive to movements of the scale during weighing, electrical means controlled by said member for operating said valve to cut off the supply of material to the scale pan after a predetermined interval and electrically operated means for withdrawing said member to permit free weighing movement of the scale and enable the weight of material supplied to the scale to be checked.

5. Apparatus for automatically delivering and weighing material comprising in combination a hopper adapted to contain in bulk material to be weighed, a scale, a valve for controlling the supply of material from said hopper to the goods pan of said scale, an arm mounted in such wise as to be capable of following the movement of the goods pan of the scale during a weighing operation, electrical means controlled by said arm for closing said valve, and electrical means controlled by movement of said valve for causing said arm to be lifted clear of the goods pan of said scale to permit the weight of material supplied to the scale pan to be readily checked.

6. Apparatus for automatically delivering and weighing material comprising in combination a hopper adapted to contain in bulk material to be weighed, a measuring chamber communicating with said hopper, a valve for controlling the supply of material from said hopper to said chamber, a scale, a valve for controlling the supply of material from said chamber to said scale, a member adapted to follow the movements of the scale during a weighing operation, electrical means controlled by said member for opening said first mentioned valve and closing said second mentioned valve and other electrical means for preventing said member from following the movements of the scale to enable the weight of material supplied to the scale pan to be readily checked.

7. Apparatus for automatically delivering and weighing material comprising in combination a hopper, a measuring chamber communicating with said hopper, a scale, a valve for controlling the supply of material from said hopper to said measuring chamber and a valve for controlling the supply of material from said chamber to said scale, said valves being interconnected so that when one is open the other is closed and vice versa, an arm mounted to follow the movements of said scale under influence of the weight of material supplied thereto, electrical means controlled by said arm for cutting off the supply of material from said chamber after a predetermined interval and electrical means controlled by movement of said valves for lifting said arm clear of said scales to permit free weighing movement thereof to enable the weight of material to be checked.

8. Apparatus for automatically delivering and weighing material as claimed in claim 5 in which said arm is pivotally mounted and biassed so that one end thereof is capable of bearing lightly upon and following the movement of the scale pan due to the weight of material supplied thereto.

9. Apparatus for automatically delivering and weighing material as claimed in claim 6 comprising means for varying the capacity of said measuring chamber.

10. Apparatus for automatically delivering and weighing material as claimed in claim 7 comprising means for varying the capacity of said measuring chamber.

JOHN HUGHES.
THOMAS OTTIWELL WARD.